US007343940B2

(12) United States Patent
Loeffler et al.

(10) Patent No.: US 7,343,940 B2
(45) **Date of Patent: *Mar. 18, 2008**

(54) WIRE COMB

(75) Inventors: Gordon P. (Skip) Loeffler, Las Vegas, NV (US); Geoff J. Gomes, Las Vegas, NV (US); Dennis W. Newberry, Las Vegas, NV (US)

(73) Assignee: Adobe Communications Electronics, Inc., Las Vegas, NV (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/294,434

(22) Filed: Dec. 6, 2005

(65) Prior Publication Data

US 2006/0096654 A1 May 11, 2006

Related U.S. Application Data

(63) Continuation of application No. 10/752,598, filed on Jan. 8, 2004, now Pat. No. 6,976,512.

(51) Int. Cl.
*B21F 1/02* (2006.01)
*B23P 19/00* (2006.01)

(52) U.S. Cl. ......................... 140/147; 140/123; 29/755

(58) Field of Classification Search ................ 140/147, 140/149, 123; 29/755, 748; 439/942; 174/93; 385/86, 87, 136, 137
See application file for complete search history.

(56) References Cited

U.S. PATENT DOCUMENTS

| | | | | |
|---|---|---|---|---|
| 2,209,063 | A | 7/1940 | Merrick | |
| 2,260,443 | A | 10/1941 | Downing, Sr. | |
| 2,337,055 | A | 12/1943 | Mathias et al. | |
| 2,966,774 | A | 1/1961 | Bowen | |
| 3,634,571 | A | 1/1972 | Klepp et al. | |
| 3,667,101 | A | 6/1972 | Kloth | |
| 3,972,356 | A | 8/1976 | Kjarsgaard | |
| 4,420,020 | A | 12/1983 | McGeary et al. | |
| 4,998,343 | A | 3/1991 | Costello | |
| 5,207,857 | A | 5/1993 | Tanabe et al. | |
| 5,853,033 | A | 12/1998 | Kavanagh | |
| 6,528,728 | B1 * | 3/2003 | Shima | 174/101 |
| 6,736,669 | B1 * | 5/2004 | Martin et al. | 439/527 |
| 2002/0104577 | A1 | 8/2002 | McGroarty | |
| 2004/0050583 | A1 * | 3/2004 | Denton | 174/135 |

* cited by examiner

*Primary Examiner*—Derris H. Banks
*Assistant Examiner*—Teresa M Bonk
(74) *Attorney, Agent, or Firm*—Sughrue Mion, PLLC

(57) ABSTRACT

A wire comb and method for assembling an organized bundle, such as a bundled cable, from a plurality of strands using the wire comb. The wire comb includes an inner component as a hub and an outer component as a collar. The hub has slots configured to accept the plurality of strands lengthwise, and at least one projection that extends beyond an outer perimeter of the hub. The collar has at least one recess configured to interface with the projection of the hub for connecting the hub to the collar. The collar also has an opening that allows the plurality of strands to be inserted into the collar prior to connecting the hub with the collar. As such, combing can be accomplished without requiring that the wire combing commence from either end of the strands.

7 Claims, 4 Drawing Sheets

WIRE COMB

This is a continuation of application Ser. No. 10/752,598, filed Jan. 8, 2004 now U.S. Pat. No. 6,976,512, the entire disclosure of which is hereby incorporated by reference.

BACKGROUND OF THE INVENTION

1. Field of the Invention

The present invention relates to a wire comb and method for assembling an organized bundle from a plurality of strands, such as wires or cables, and more specifically, to a wire comb that can be applied to strands for combing at any point lengthwise.

2. Background of the Related Art

In the related art, several methods and devices, such as wire combs, exist for the purpose of assembling an organized bundle from a plurality of strands. U.S. Patent Application Publication No. US 2002/0104577 A1 (hereafter "McGroarty"), also published as International Publication Number WO 02/062505 A1, discloses a related art wire comb that permits combing and straightening of wires or cables for CAT-5 cables. As illustrated in FIG. 1 of McGroarty, a plurality of holes 25-32 are sized to receive a separate wire or cable. These separate wires or cables are threaded through each of the holes 25-32 from their respective first ends. The bundle of wires or cables are then combed lengthwise from the first ends to the second ends, so that all wires are located at the same relative position with respect to one another along the entire length of the cable bundle.

However, the related art wire comb of McGroarty has various problems and disadvantages. For example, because McGroarty uses holes, the wires or cables can only be bundled from one end to an opposite end. As a result, the entire cable bundle must be combed at once, as segments cannot be separately combed.

Another method of bundling strands, such as cables, is for a technician to dress the cables by hand. This allows for only a portion of the length of the cable to be bundled, but requires significant time and effort on the part of the technician.

SUMMARY OF THE INVENTION

It is an aspect of the present invention to overcome at least the above-described problems and disadvantages in the related art by providing a wire comb apparatus for assembling an organized bundle from a plurality of strands that can be applied to the strands at any point lengthwise. When discussed herein, the term strand can represent any type of wire, cable, fiber, sheath cable, etc., known to those of ordinary skill in the art that is bundled for use as a transmission medium. The transmission medium can represent, for example, a medium for transmitting and/or receiving communications, electrical signals, or other types of transmissions known to artisans in the electrical, electronic, or communications fields.

An apparatus consistent with the invention relates to an apparatus for assembling an organized bundle from a plurality of strands, comprising an inner component that includes a plurality of outwardly extending protrusions having corresponding slots formed therebetween, wherein said slots are configured to accept corresponding ones of said plurality of strands lengthwise, and at least one projection that extends beyond an outer perimeter of said inner component; and an outer component having an inner perimeter that fits the outer perimeter of said inner component, and having at least one recess configured to mate with said at least one projection.

The outer component comprises an opening such that such that the plurality of strands can be positioned within the outer component prior to fitting the outer component to the inner component. This allows the wire comb to be applied to strands used in forming the organized bundle at any point lengthwise.

The invention also includes a method of assembling an organized bundle from a plurality of strands. This method comprises selecting an inner hub that corresponds to a type of said organized bundle to be generated; arranging said strands in corresponding kink-free runs; distributing ones of said strands into corresponding slots of the inner hub; positioning said plurality of strands inside an outer collar having an inner perimeter that fits an outer perimeter of said inner hub, via an opening of said outer collar; aligning the outer collar with the inner hub so that the outer collar is connected to the inner hub to form a unitary wire comb; sliding the wire comb lengthwise along the strands to form said organized bundle; and tying the organized bundle as needed.

BRIEF DESCRIPTION OF THE DRAWINGS

The accompanying drawings, which are included to provide a further understanding of illustrative, non-limiting embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the illustrative, non-limiting embodiments of the present invention, examples of which are illustrated in the accompanying drawings. In the present invention, the terms are meant to have the definition provided in the specification, and are otherwise not limited by the specification.

Figure 1A:
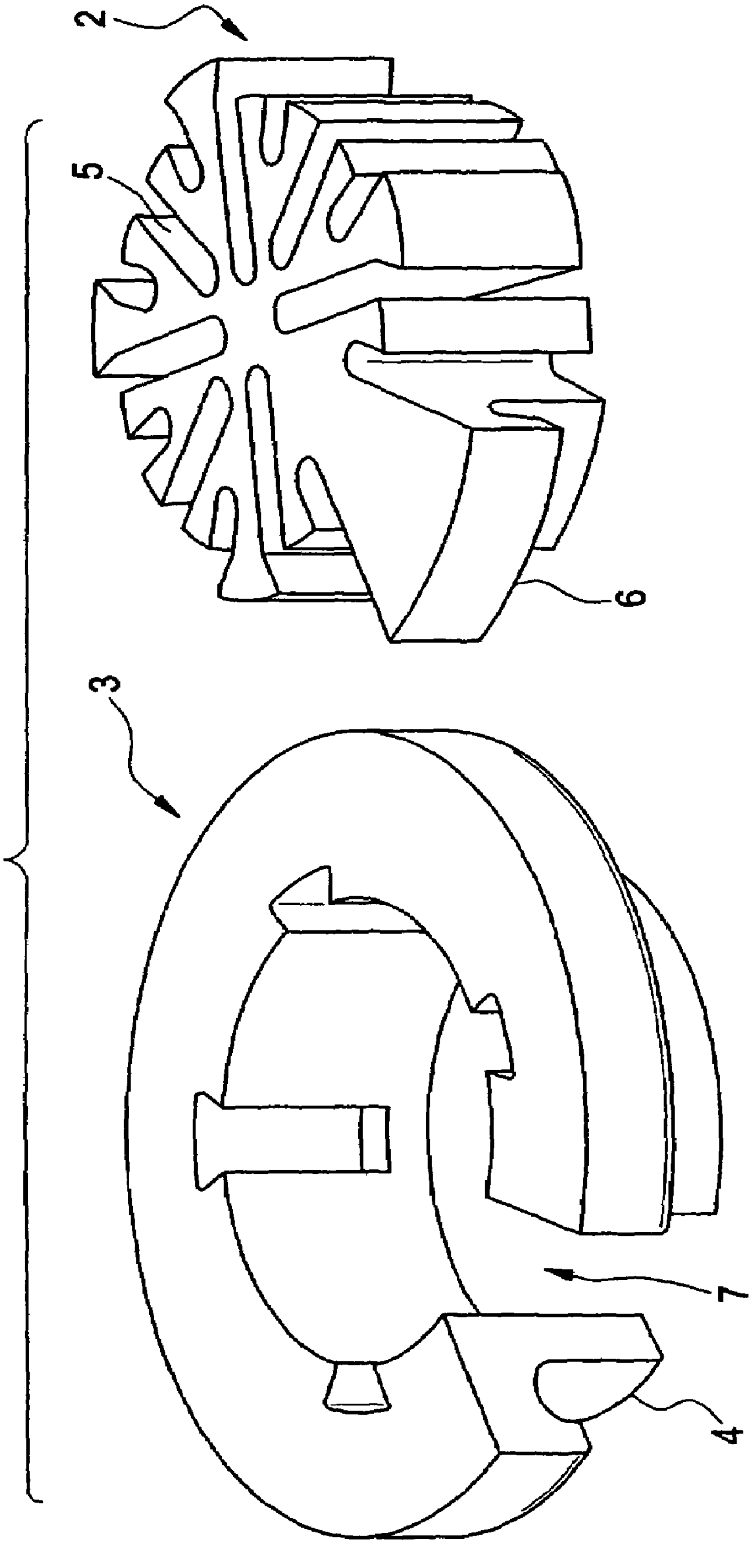
FIGS. 1*a* and 1*b* illustrate an inner hub and outer collar that form a wire comb according to an exemplary, non-limiting embodiment of the present invention.
Figure 1B:
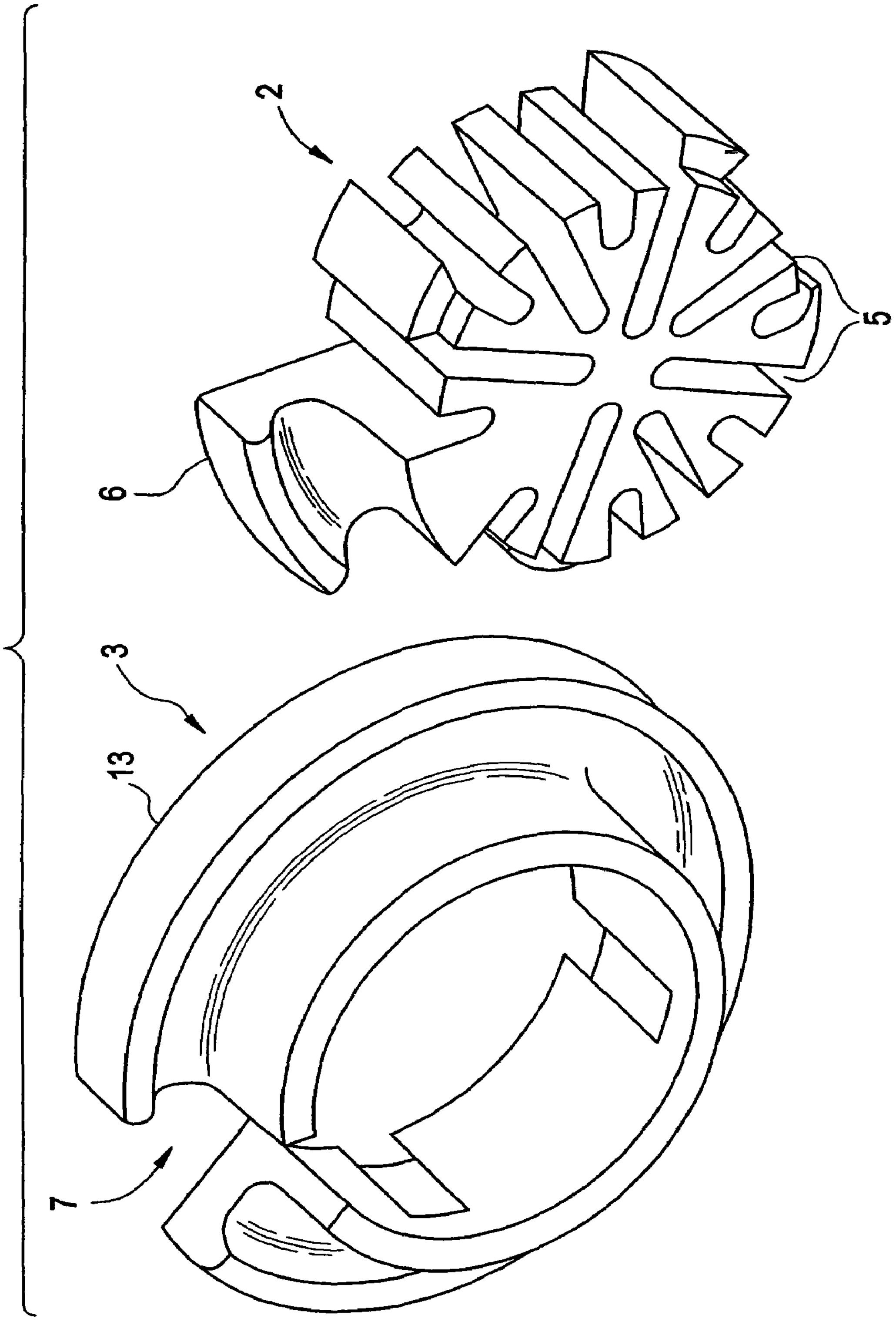

A wire comb assembly is provided that allows a user to perform wire combing at any location along a length of strands. FIGS. 1(*a*) and 1(*b*) depict a connectable inner piece 2 and an outer piece 3 that form a wire comb 1 according to an exemplary, non-limiting embodiment of the present invention.

The wire comb 1 includes the connectable inner piece 2 and outer piece 3. For example, but not by way of limitation, the inner piece 2 is a hub, and the outer piece 3 is an outer collar that fixably slides around the hub. The inner hub 2 is configured to interlock with the outer collar 3, such that the wire comb 1 operates as a single unit once assembled. The inner hub 2 and outer collar 3 may be formed, for example, by plastic injection molding, Computer Numerical Control (CNC) machining of a metal or composite material, or using other fabrication materials and methods known to those of ordinary skill in the art.

The inner hub 2 includes a plurality of open and slotted apertures 5, each of which is configured to accept at least one strand, such as a wire or cable. Additionally, the inner hub 2 has at least one outwardly extending protrusion 6 that extends beyond the perimeter created by the plurality of open and slotted apertures 5. That is, this perimeter is associated with the plurality of slotted apertures 5 rather than a perimeter of the outwardly extending protrusion 6.

Various types of inner hubs 2 may be used to accommodate different strands. For example, but not by way of limitation, the inner hub 2 may be color coded to accommodate various types of strands, including (but not limited to) Category 5, Category 6, coaxial, UTP, ScTP, IW, etc., and other types of strands that one skilled in the art would use in communications, electrical, or electronic transmission mediums. Of course, as mentioned above, the strands are not limited to these examples. Color coding of the inner hub 2 would make it easy for a technician to quickly identify and select the proper type of inner hub 2 based on strand type.

The outer collar 3 has at least one recess 4 that aids in gripping during the operation of the wire comb 1 (e.g., when pulling the wire comb over a bundle of strands to form an organized bundle). Of course, other means may be employed to promote gripping such as rubberizing or texturing the surface 13 of the outer collar 3, or configuring handles into the outer collar 3 itself. Recess 4 is configured to mate with the protrusion 6 of the inner hub 2. In one embodiment, this configuration can be designed such that the inner hub 2 and outer collar 3 are only able to fixably connect to one another in one insertion direction. Further, the outer collar 3 is designed to accept any of the above-described interchangeable hubs (e.g., color-coded hubs). In addition, the outer collar 3 includes an opening 7, such that the strands of the bundle can be positioned within the outer collar 3 prior to connecting of the outer collar 3 to the inner hub 2.

Figure 2:
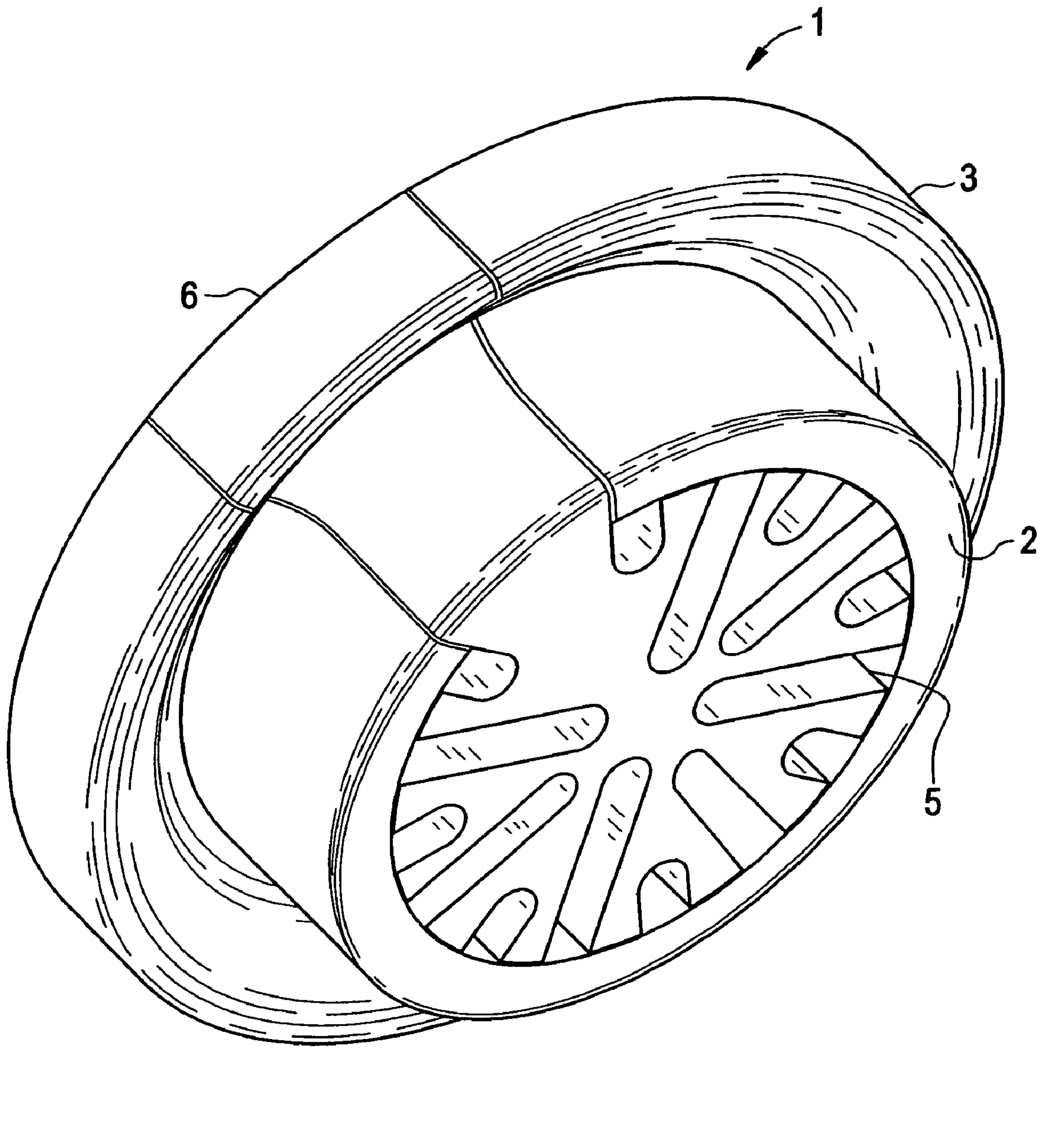
FIG. 2 is a perspective view showing a wire comb according to an exemplary, non-limiting embodiment of the present invention.

As shown in FIG. 2, when the inner hub 2 and the outer collar 3 are fixably connected to one another, the wire comb 1 forms a single piece, as such, operating so that the user can slide the wire comb 1 along a lengthwise segment of strands. Once the wire combing is complete, the wire comb 1 can be removed from the organized bundle by decoupling the inner hub 2 and the outer collar 3 from one another.

In operation, a plurality of strands (not shown) are each fitted in respective slotted apertures 5. This fitting may take place not only at an end of the strands, but anywhere along the length of the strands. Once the strands are in the slots 5, the inner hub 2 is ready to accept the outer collar 3.

The outer collar 3 is arranged in a direction such that its recess 4 will mate with the protrusion 6 of the inner hub 2. Then, all of the strands are placed inside the outer collar 3 via the opening 7. The outer collar 3 can then be mated with the inner hub 2 by matching the recess 4 with the protrusion 6. Once the inner hub 2 and the outer collar 3 are tightly connected to one another, the wire comb 1 can be operated.

Figure 3:
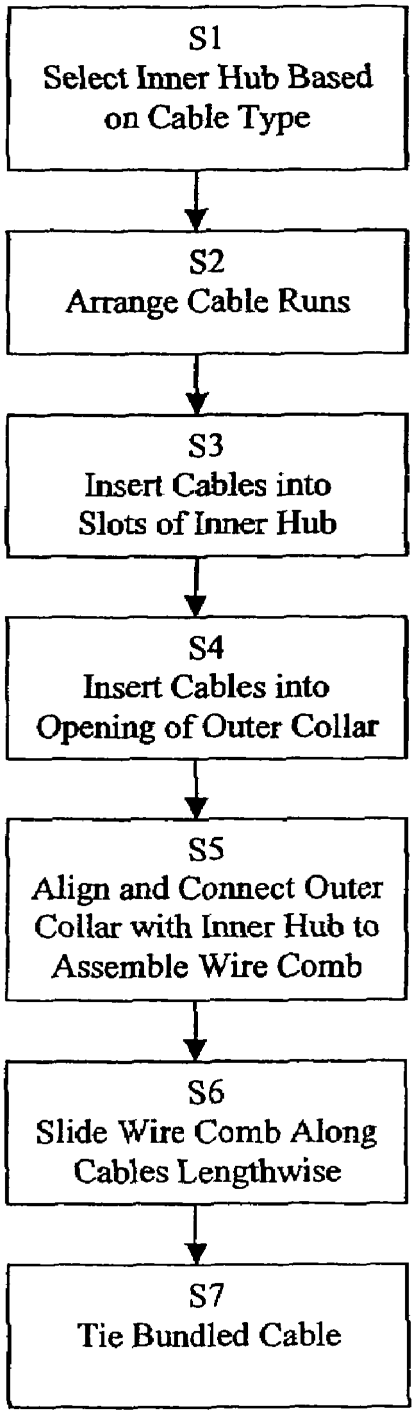
FIG. 3 illustrates a method of performing wire combing according to an exemplary, non-limiting embodiment of the present invention.

More specifically, FIG. 3 illustrates a method of operating the wire comb according to an exemplary, non-limiting embodiment of the present invention. At step S1, the inner hub 2 that corresponds to the type of strand, in this embodiment, cable, to be bundled is selected. For example, but not by way of limitation, a hub having a first color that corresponds to a Category 5 cable, a hub having a second color that corresponds to a Category 6 cable, and so on, for any number of types of cable. The width of the slots 5 of the inner hub 2 are based on the type of cable to be combed.

At step S2, the cables to be bundled are arranged in kink-free runs; straight runs being preferable. Of course, steps SI and S2 can be reversed. At step S3, the cables are inserted into corresponding slots 5 of the inner hub 2, so that the individual cables of the bundle are distributed in the slots. For example, but not by way of limitation, each of the slots 5 may have a corresponding cable therein.

Once the cables have been inserted, at step S4, all of the cables are installed through the opening 7 in the outer collar 3. At step S5, the outer collar 3 is then aligned with the inner hub 2, such that the protrusion 6 of the inner hub 2 matches the recess 4 of the outer hub 3. At this point, the inner hub 2 and outer collar 3 are coupled to form the operational wire comb 1.

Next, at step S6, the wire comb 1 is slid down the cables lengthwise. The cables enter the wire comb 1 as separate strands and emerge from the wire comb 1 as an organized, combed tight bundle. At step S7, a tying means is placed around the organized, combed tight bundle. The tying means can include, for example, nylon or Velcro tie wraps, or cable clamps, etc. Step S7 can be performed at various intervals as necessary (e.g., every 2 to 3 feet, but not limited thereto) to maintain bundle integrity.

While the wire comb 1 of the present invention is illustrated to be circular in nature, the present invention is not limited thereto, and any other shape or form could be applied that permits wire combing. Further, any number and shape of recesses and protrusions may be used to secure the inner hub and the outer collar to each other to form the wire comb.

The exemplary, non-limiting embodiment of the present invention has various advantages over at least the foregoing related art. For example, but not by way of limitation, a lengthwise portion of the cable bundle can be combed without requiring that the wire combing commence from either end of the wires.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. An apparatus for assembling an organized bundle from a plurality of strands, comprising:

a first component, including a plurality of outwardly extending protrusions having correponding slots formed therebetween, said slots configured to accept corresponding ones of said plurality of strands lengthwise; and a second component mated with said first component, wherein the first component includes a projection provided between adjacent slots and configured to interface with said second component.

2. The apparatus of claim 1, wherein the second component includes means for positioning the plurality of strands within the second component prior to mating the second component with the first component.

3. An apparatus for assembling an organized bundle from a plurality of strands, comprising:

an inner component, including laterally offset slots for accepting ones of said plurality of strands lengthwise and at least one projection that projects beyond an outer perimeter of said inner component, and an outer component mating to said inner component to form said apparatus, wherein an inner perimeter of the outer component fits the outer perimeter of the inner component.

4. The apparatus of claim 3, wherein the outer component is a collar.

5. The apparatus of claim 3, wherein the outer component surrounds at least part of an exterior periphery of the inner component.

6. The apparatus of claim 1, wherein the projection is configured to interface with an opening of the second component.

7. An apparatus for assembling an organized bundle from a plurality of strands, comprising:

a first component, including means for accepting ones of said plurality of strands lengthwise, and a second component including means for mating with said first component to form said apparatus, wherein the second component includes at least one of a recess and opening for mating with said first component;

wherein the means for accepting the ones of said plurality of strands lengthwise includes a plurality of outwardly extending protrusions having corresponding slots formed therebetween, said slots configured to accept corresponding ones of said plurality of strands lengthwise.

* * * * *